(12) United States Patent
Uehara

(10) Patent No.: US 6,246,357 B1
(45) Date of Patent: Jun. 12, 2001

(54) RADAR APPARATUS

(75) Inventor: Naohisa Uehara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/397,964

(22) Filed: Sep. 17, 1999

(30) Foreign Application Priority Data

May 28, 1999 (JP) .................................................. 11-149321

(51) Int. Cl.$^7$ ....................................................... G01S 13/93
(52) U.S. Cl. ............................ 342/70; 342/99; 342/133; 342/135; 342/139; 342/141; 342/146; 342/158; 342/196
(58) Field of Search ................................. 342/70, 71, 72, 342/99, 133, 135, 139, 141, 146, 158, 192, 196

(56) References Cited

U.S. PATENT DOCUMENTS

| | | | |
|---|---|---|---|
| 4,319,425 | * | 3/1982 | Mawhinney ........................... 342/104 |
| 5,361,070 | * | 11/1994 | McEwan ................................. 342/21 |
| 5,731,778 | * | 3/1998 | Nakatani et al. ....................... 342/70 |
| 5,751,240 | * | 5/1998 | Fujita et al. ............................ 342/70 |
| 5,757,307 | * | 5/1998 | Nakatani et al. ....................... 342/70 |
| 5,826,216 | * | 10/1998 | Lyons et al. ........................... 702/143 |

* cited by examiner

Primary Examiner—John B. Sotomayor
(74) Attorney, Agent, or Firm—Sughrue, Mion, Zinn, Macpeak & Seas, PLLC

(57) ABSTRACT

A radar apparatus is provided with signal converting means for FFT-transforming an output signal of reception means for detecting a reception electromagnetic wave; amplitude peak value detecting means for detecting a peak value of an amplitude level from a spectrum made by data converted by this signal converting means; beam scanning means for changing a beam direction of a transmission electromagnetic wave and also a beam direction of the reception electromagnetic wave; and measured-angle processing means operated in such a manner that when the same target object can be detected along a plurality of beam directions which are changed by the beam scanning means, an angle of the target object is calculated by employing the peak value of the amplitude levels along the respective directions, acquired by the amplitude detecting means, whereas when the target object is detectable only along a single beam direction, the angle of the target object is judged as preset angles D1, E1, F1.

10 Claims, 6 Drawing Sheets

A, B, C: ANGLE-MEASURABLE REGION

D1, E1, F1: PRESET ANGLE OF TARGET OBJECT

RADAR APPARATUS

BACKGROUND OF THE INVENTION

The present invention is related to a radar apparatus mounted on a vehicle such as an automobile, and used to constitute, for instance, a vehicle-to-vehicle safety distance warning system. More specifically, the present invention is directed to a radar apparatus capable of increasing a maximum sensing distance and also an angle measuring area of a system.

As this sort of radar apparatus, an FMCW radar apparatus is known. That is, since a transmitting/receiving common antenna is employed, a compact FMCW radar apparatus can be constructed and thus, can be easily mounted on an automobile. FIG. 10 is a block diagram for representing an arrangement of a conventional on-vehicle radar apparatus. In FIG. 10, reference numeral 1 indicates an oscillator, reference numeral 2 shows a power divider, reference numeral 3 represents a transmitter amplifier, and reference numeral 4 denotes a circulator. Also, reference numeral 5 indicates a transmitting/receiving common antenna, and this antenna is arranged by an electromagnetic radiator 51 and a reflection mirror 52. Furthermore, reference numeral 6 indicates a target object, reference numeral 7 indicates a receiver amplifier, reference numeral 8 represents a mixer, reference numeral 9 shows a filter, and reference numeral 10 indicates an AGC amplifier. Further, reference numeral 11 represents an A/D converter, reference numeral 12 shows a signal processing apparatus, reference numeral 13 indicates an antenna scanning motor, and reference numeral 14 represents an handle angle sensor.

Next, operation of the conventional radar apparatus with employment of the above-described arrangement will now be explained. The signal processing apparatus 12 outputs a linear voltage signal for an FM modulation. In response to this FM-modulating voltage signal, the oscillator 1 produces an FM-modulated electromagnetic wave. This electromagnetic wave is divided into two wave portions by the power divider 2. One divided electromagnetic wave portion is entered into the mixer 8. After the other divided electromagnetic wave portion is amplified by the transmitter amplifier 3, the amplified electromagnetic wave portions radiated via the circulator 4 from the transmitting/receiving common antenna 5 to the space. The electromagnetic wave which is radiated as a transmission electromagnetic wave from the transmitting/receiving common antenna 5 to the space is reflected from the target object 6, and then is entered into the transmitting/receiving common antenna 5 as a reception electromagnetic wave having a delay time "Td" with respect to the transmission when the target object 6 owns a relative speed, the reception electromagnetic wave having a Doppler shift "fd" with respect to the transmission electromagnetic wave is inputted to the transmitting/receiving common antenna 5. After the electromagnetic wave received by the transmitting/receiving common antenna 5 is amplified by the receiver amplifier 7, the amplified electromagnetic wave is mixed with the electromagnetic wave produced from the oscillator 1 by the mixer 8, so that a beat signal corresponding to both the delay time "Td" and the Doppler shift "fd" is outputted. The resulting beat signal is filtered by the filter 9, and the filtered signal is amplified by the AGC amplifier 10, and thereafter, the amplified signal is entered into the A/D converter 11. Based upon the A/D-converted beat signal, the signal processing apparatus 12 calculates a distance measured from the target object 6 and a relative speed.

Next, a description will now be made of a method for calculating a distance and a relative speed. FIG. 11 is an explanatory diagram for explaining an example of a method for calculating a distance and a relative speed by a conventional on-vehicle radar apparatus. In FIG. 11, a transmission electromagnetic wave is FM-modulated by a frequency sweeping bandwidth "B" and a modulation period "Tm". A reception electromagnetic wave owns delay time "Td" defined by such that the transmission electromagnetic wave is reflected from a target object 6 located at a distance "R" and then the reflected transmission electromagnetic wave is entered into the transmitting/receiving antenna 5. Also, when the target object 6 owns a relative speed "V", a reception electromagnetic wave is Doppler-shifted by "fd" with respect to a transmission electromagnetic wave. At this time, both a frequency difference "fbu" between a transmission signal and a reception signal when a frequency is increased, and another frequency difference "fbd" between a transmission signal and a reception signal when a frequency is decreased are outputted as a beat signal from a mixer 8. This beat signal is acquired via an A/D converter 11 into a signal processing apparatus 12 as data. This acquired beat signal is processed by way of the FFT (Fast Fourier Transform) so as to obtain the frequency differences "fbu" and "fbd", and also a peak value of amplitude levels thereof. It should be understood that the peak value of the amplitude level is a value equivalent to a reception strength, and will be referred to as a "reception strength" hereinafter.

A method for obtaining the frequency differences "fbu" and "fbd", and also the reception strength "M" will now be summarized as follows: That is, when the FFT process operation is carried out, the amplitude signals with respect to the respective abscissa time and ordinate time can be converted into the amplitudes of the frequency components with respect to the respective abscissa frequency and ordinate frequency. In the case that the frequency difference "fbu" and the reception strength "M" are acquired, generally speaking, such a peak point where a level of amplitude becomes a peak is found out, and an amplitude level value of this peak and a frequency value thereof are assumed as the reception strength M and the frequency difference "fbu". In general, the reception strengths of the frequency differences "fbu" and "fbd" are identical to each other, and become "M".

Based upon the above-described items "fbu", "fbd", "Tm", and "B", the light velocity "C (=3.0×10$^8$ m/s)", and a wavelength "λ" of a carrier wave (if a basic frequency of a carrier wave is defined as $f_0$=77 GHz, then a wavelength "λ" is given as λ=4.0×10$^{-3}$ m), the distance "R" and the relative speed "V" of the target object 6 are calculated by the below-mentioned formulae (1) and (2):

$$R = (TmC/4B) \times (fbu + fbd) \qquad (1)$$

$$V = (\lambda/4) \times (fbu - fbd) \qquad (2)$$

Also, in the case that a plurality of target objects are located, based upon a plurality of frequency differences "fbu" between transmission signals and reception signals when a frequency is increased, and a plurality of frequency differences "fbd" between transmission signals and reception signals when a frequency is decreased, both "fbu" and "fbd" of the same object are selected. Then, the distance "R" and the relative speed "V" are obtained from the above-described formulae (1) and (2).

Next, a description will now be made of a method for calculating a direction (angle) of the target object 6 by the signal processing apparatus 12 from the reception strength "M". As the conventional method for calculating the direction of the target object, the following typical methods have been disclosed, i.e., the mono-pulse method, the sequential lobing method, and the conical scanning method, for example, in the Examined Japanese Patent Application Publication No. Hei 7-20016. In this case, the sequential lobing method is described.

The sequential lobing method is summarized as follows. That is, after a distance, a relative speed, and a reception strength M1 have been measured along a preselected direction "θ1", the signal processing apparatus 12 actuates the motor 13 so as to move the transmitting/receiving common antenna 5 along a next direction "θ2", and then, similarly, measures a distance, a relative speed, and a reception strength "M2". The signal processing apparatus 12 selects the same distance data and the same relative speed data from the data detected along these plural directions, and can basically measure an angle by checking as to whether or not the reception strength M1 is higher than the reception strength M2.

It should be understood that symbol "θ" indicates an angle, in which a front direction of a vehicle is set to "0°", a forward right oblique direction of the vehicle is set to a "positive angle", and a forward left oblique direction of the vehicle is set to a "negative angle".

Concretely speaking, both a summation pattern S (θ) and a difference pattern D(θ) are calculated from an antenna beam pattern B1 (θ) and another antenna beam pattern B2 (θ) along two predetermined directions "θ1" and "θ2" by the below-mentioned formulae:

$$S(\theta)=B1(\theta)+B2(\theta) \quad (3)$$

$$D(\theta)=B1(\theta)-B2(\theta) \quad (4)$$

Next, DS (θ) of the following formulae which is normalized by S (θ) is obtained=

$$DS(\theta)=D(\theta)/S(\theta) \quad (5)$$

It should be noted that DS (θ) is a monotone increase, or a monotone decrease with respect to "θ" within a half-value width "θs" of S (θ).

Next, while a center between θ1 and θ2 along two predetermined directions is set as "θo" and a half-value width of S(θ) is set as "θs", both an angle "θn" normalized by "θs" and an inclination "K" of DS (θ) in the vicinity of θn=0 are calculated by the following formulae=

$$\theta n=(\theta-\theta o)/\theta s \quad (6)$$

$$k=DS(\theta)/\theta n \quad (7)$$

Also, DS acquired from a monitoring result is calculated based on both the reception strength M1 and the reception strength M2 by the following formulae:

$$DS=(M1-M2)/(M1+M2) \quad (8).$$

As a result, based upon the precalculated θs, K, θo, and also DS acquired from the monitoring operation, the angle "θ" may be calculated by the below-mentioned formula (9):

$$\theta=(\theta s/k)\cdot DS+\theta o \quad (9).$$

A relative position of a car driven ahead can be grasped based on the above-measured distance and also angle up to the target object. Also, when a curvature of a road can be grasped from the handle angle sensor 14, a position of a lane along which the own car is driven (lane width is predetermined as 3.5 m). As a result, it can be seen whether or not the car driven ahead is traveled on the same lane as the own car. A judgement is made in this manner as to whether or not the target object corresponds to the car driven ahead which is traveled on the same lane as the own car. Based upon the judgement result, the signal processing apparatus issues the vehicle-to-vehicle safety distance warning notification and also executes the forward-vehicle-following drive so as to keep the safety vehicle-to-vehicle distance.

Since the angle measuring operation is carried out by employing the above-explained formulae (3) to (9) in the above-described conventional radar apparatus, the following condition is required. That is, the same target is detected along at least two directions. As a result, when the conventional radar apparatus is employed so as to constitute, for instance, a vehicle-to-vehicle safety distance warning system, there is such a problem that both the maximum detection distance along which the angle can be measured, and the angle-measurable area would be deteriorated, as compared with the originally designed performance of this radar apparatus.

SUMMARY OF THE INVENTION

The present invention has been made to solve the above-described problem, and therefore, has an object to provide such a low-cost radar apparatus with higher performance, suitably mounted on a vehicle, capable of deteriorating a maximum sensing distance and an angle-measurable area defined by a radar system, as compared with the originally designed performance of the radar system. That is, this high-performance radar apparatus is provided with such a measured-angle processing means operated in such a manner that when the same target object can be detected along a plurality of beam directions which are changed by a beam scanning means, an angle of the target object is calculated by employing a peak value of amplitude levels along the respective directions, acquired by an amplitude detecting means, whereas when the target object is detectable only along a single beam direction, the angle of the target object is judged as preset angles.

A radar apparatus, according to the present invention, is featured by comprising: transmitting means for outputting a transmission electromagnetic wave; receiving means for detecting a reception electromagnetic wave received when said transmission electromagnetic wave is reflected from a target object and returned from the target object; signal converting means for converting an output signal of the receiving means into data indicated by a relationship between a frequency and an amplitude level of the output signal, from which a frequency spectrum is revealed; amplitude peak value detecting means for detecting a peak value of the amplitude level from the frequency spectrum by the data converted by the signal converting means; beam scanning means for changing both a beam direction of the transmission electromagnetic wave and a beam direction of the reception electromagnetic wave; and measured-angle processing means for calculating angles of the same target object, which are detected along a plurality of beam directions changed by the beam scanning means, by employing the peak values of the amplitude levels detected by the amplitude peak value detecting means along the respective directions; and for judging that an angle of the target object detected only along a single beam direction as a preset angle.

Also, an angle of the target object is set to be equal to an angle of a detected beam.

Further, a radar apparatus, according to the present invention, is featured by comprising: transmitting means for outputting a transmission electromagnetic wave; receiving means for detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; amplitude peak value detecting means for detecting a peak value of the amplitude level from the frequency spectrum by the data converted by the signal converting means; beam scanning means for scanning plural directions while stopping a beam of the transmission electromagnetic wave and a beam of the reception electromagnetic wave at a predetermined angle, and for changing the beam stopping angle in a preselected sequence; and measured-angle processing means for calculating angles of the same target object, which are detected along a plurality of beam directions changed by the beam scanning means, by employing the peak values of the amplitude level detected by the amplitude peak value detecting means along the respective directions.

Also, the beam scanning means changes the beam stopping angle every scanning period; and the measured-angle processing means employs peak values of amplitude levels acquired along a plurality of beam directions within the same scanning period. Furthermore, the beam scanning means changes the beam stopping angle every scanning period; and the measured-angle processing means employs peak values of amplitude levels acquired along a plurality of beam directions within first and second scanning periods.

In addition, the beam scanning means scans in such a manner that the beam is reciprocated during one scanning period.

Also, the transmitting means outputs a transmission electromagnetic wave which is frequency-swept; the beam scanning means changes the beam stopping angle every time the frequency sweeping operation is performed; and the measured-angle processing means employs peak values of amplitude levels acquired along adjoining beam directions.

Moreover, the beam scanning means scans in such a manner that a change amount of the beam stopping angle becomes a half of an angle defined between the adjoining angles.

Also, a radar apparatus, according to the present invention, is featured by comprising: transmitting means for outputting a transmission electromagnetic wave; receiving means for detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; amplitude peak value detecting means for detecting a peak value of the amplitude level from the frequency spectrum by the data converted by the signal converting means; beams scanning means for scanning plural directions while stopping a beam of the transmission electromagnetic wave and a beam of the reception electromagnetic wave at a predetermined angle, and for moving the beams over an entire scanning region while sequentially and slightly changing the beam stopping angle; and measured-angle processing means for calculating angles of the same target object, which are detected along a plurality of beam directions changed by the beam scanning means, by employing the peak values of the amplitude levels detected by the amplitude peak value detecting means along the respective directions; and for calculating an angle of the target object detected only along a single beam direction from a change in the peak values of the amplitude levels.

Furthermore, the signal converting means executes the fast Fourier transform.

DETAILED DESCRIPTION OF THE PREFERRED EMBODIMENTS (EMBODIMENT 1)

Before describing an embodiment 1 of the present invention, a general angle-measuring operation will now be explained.

Figure 1:
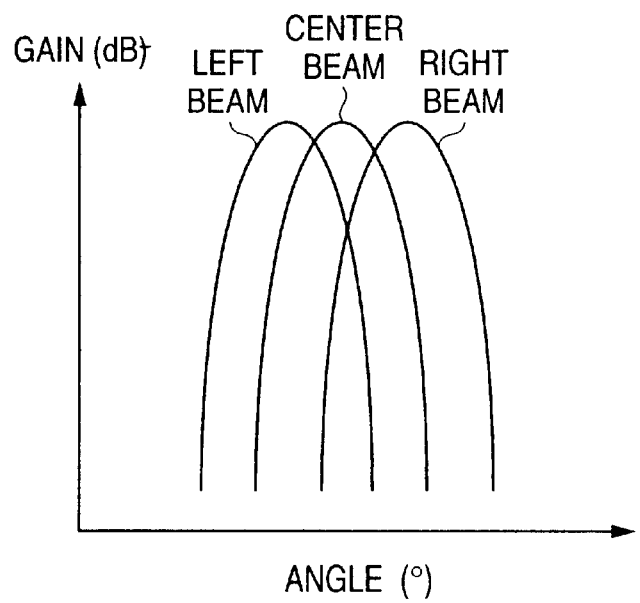
FIG. 1 is a diagram for represents a relationship in which a beam pattern along each of directions is indicated by an angle and a gain when an antenna is directed along three directions.
Figure 2:
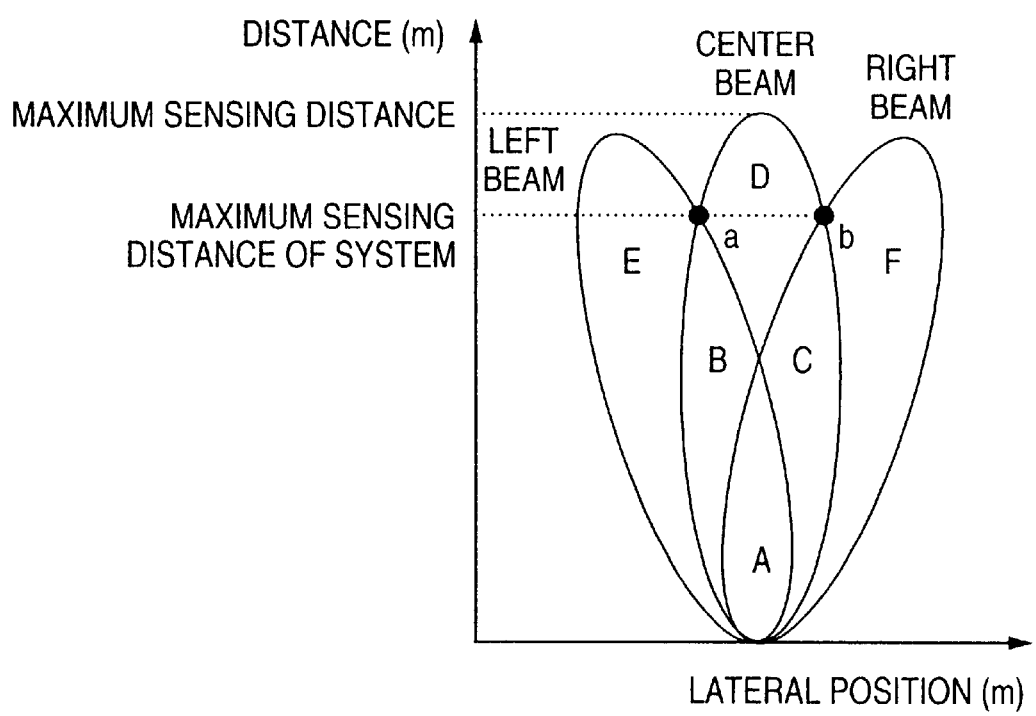
FIG. 2 is a diagram for showing such a condition that the beam pattern of FIG. 1 is converted into a relationship between a lateral position and a distance.
Figure 10:
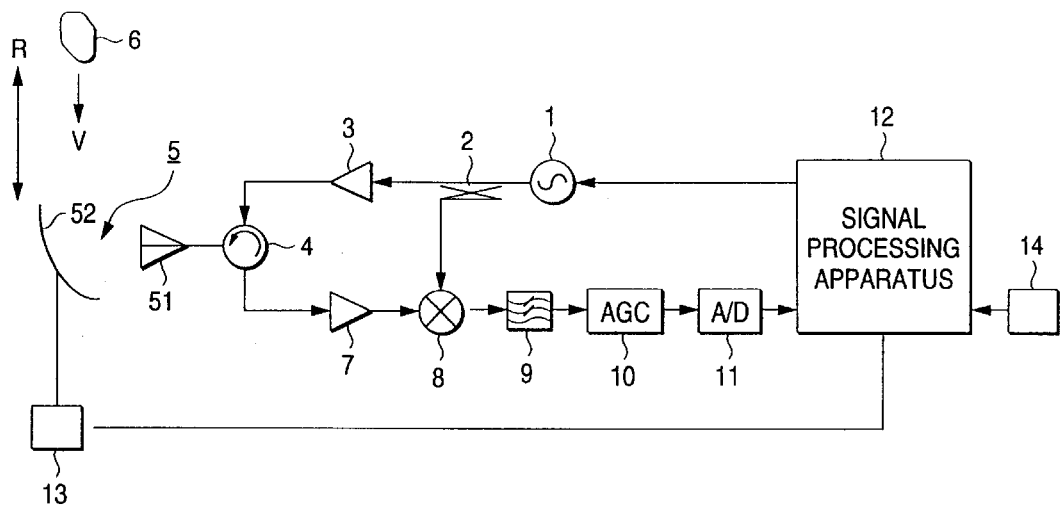
FIG. 10 is a block diagram for showing the arrangement of the conventional on-vehicle radar apparatus.
Figure 11:
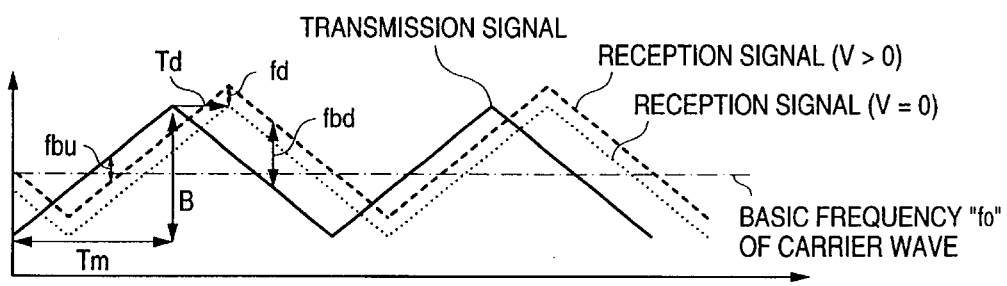
FIG. 11 is an explanatory diagram for explaining the method for calculating the distance and the relative speed in the conventional radar apparatus.

In this description, a total number of beams during 1 scanning operation is selected to be 3. Both a distance measuring method and a speed measuring method are identical to these methods of the prior art. In FIG. 10, the antenna scanning motor 13 is controlled in such a manner that the reflection mirror 52 is stopped at angles along three predetermined directions. A beam pattern of the radar apparatus with employment of the above-described arrangement is constituted by, as shown in FIG. 1, a left beam radiated along a left direction, a center beam radiated along a center direction, and a right beam radiated along a right direction. In this case, since the maximum sensing distance of this radar apparatus is determined based upon a maximum gain value of the center beam, a gain value (db) and an angle value (°) shown in FIG. 1 may be converted into a distance (m), and a lateral position (m), respectively, shown in FIG. 2. In FIG. 2, the following assumption is made: That is, a region detectable by all of a left beam, a center beam, and also a right beam is assumed as a "region A"; another region detectable by the left beam and the center beam except for the region A is assumed as a "region B"; and another region detectable by the center beam and the right beam except for the region A is assumed as a "region C". Also, another region which can be exclusively detected only by the left beam is assumed as a "region E"; another region which can be exclusively detected only by the center beam is assumed as a "region D"; and a further region which can be exclusively detected only by the right beam is assumed as a "region F".

As previously explained, there is such a condition that the same target is detected along at least two directions in order to measure an angle in accordance with the conventional angle-measuring method. As a result, angles of targets located in the above-explained regions "E", "D", and "F" cannot be measured. Also, such a radar apparatus requires the above-described angle measurement because of the following reasons. That is, for example, this radar apparatus is operated so as to issue a so-called "vehicle-to-vehicle safety distance warning notification", and also to perform a so-termed "angle-measuring operation". In the vehicle-to-vehicle safety distance warning system, when a distance between one's car and the car driven ahead is decreased shorter than, or equal to the vehicle-to-vehicle safety distance and therefore, a risky possibility of a car collision is emphasized, a warning notification is issued to the car driver of the own car. Also, since the angle-measuring operation is required to be used so as to realize a forward-vehicle following drive operation capable of keeping a vehicle-to-vehicle safety distance, a distance between the own car and a target driven ahead is detected, and also a judgement is made as to whether or not this target is traveled on the same drive lane as the own car. As a result, this angle-measuring operation may constitute a very important processing operation. Under such a circumstance, in view of the above-explained two technical points, for instance, the maximum sensing distance of this radar apparatus as the vehicle-to-vehicle safety distance warning system is equal to such a distance indicated by a point "a" and another point "b", as shown in FIG. 2. The point "a" corresponds to a cross point between the left beam and the center beam. The point "b" corresponds to a cross point between the center beam and the right beam. This maximum sensing distance would be deteriorated, as compared with the maximum sensing distance defined in view of the original performance of the radar system. In other words, although a distance and a relative speed of even such a target located far from the point "a" and the point "b" can be sensed, the sensing distance is restricted from a point where the angle-measuring operation cannot be carried out.

Conversely, since the areas where the angle-measuring operation can be carried out are equal to only the region A, the region B, and the region C shown in FIG. 2, these areas would become narrower than the sensing areas allowed by the radar performance.

Figure 3:
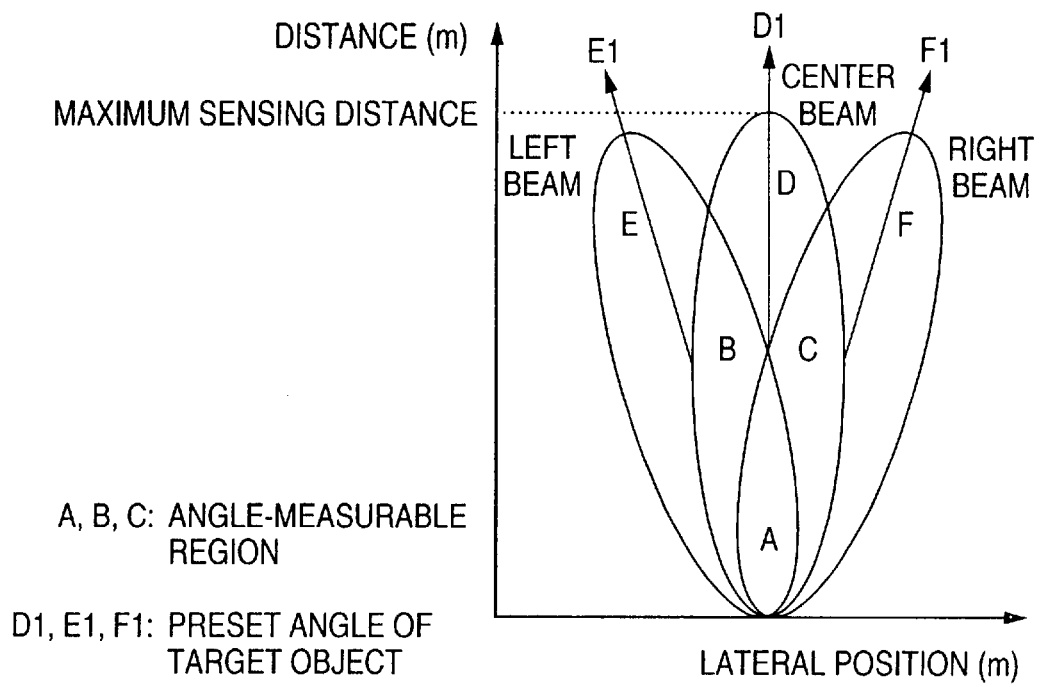
FIG. 3 is an explanatory diagram for explaining an embodiment 1 of the present invention.

To solve the above-described problem, in the embodiment 1, as shown in FIG. 3, a direction of a target detected in a region "D" is set to a center direction of a center beam. In other words, such a data is outputted that an angle of the target detected in the region "D" is equal to such an angle defined by an arrow "D1" drawn in the center beam in FIG. 3. Similarly, a direction of a target detected in a region "E" is set to a center direction of a left beam. In other words, such a data is outputted that an angle of the target detected in the region "E" is equal to such an angle defined by an arrow "E1" drawn in the left beam. Similarly, a direction of a target detected in a region "F" is set to a center direction of a right beam. In other words, such a data is outputted that an angle of the target detected in the region "F" is equal to such an angle defined by an arrow "F1" drawn in the right beam. It should be understood that the above-described data are outputted from the signal processing apparatus 12, and the angle-measuring process operations of the regions "A", "B", and "C" are identical to those of the conventional radar apparatus.

In this manner, although the directions of the targets located in the regions "D", "E", and "F" are not correctly detected, there is no risk that the maximum sensing distance of the system is deteriorated, as compared with the maximum sensing distance defined in view of the radar original performance. Also, there is no such a problem that the detection area is reduced, as compared with the detection area defined in view of the radar origianl performance. Moreover, since the regions D, E, and F are located at relatively far positions, there is no serious problem in the system operation.

In this case, the angle-measuring operation executed in such a case that the beam directions are selected to be three preselected directions has been described. When the beam scanning width is fixed, the more the total beam number is increased, the closer the directions of the targets located in such areas corresponding to the regions "D", "E", and "F" are reached to true values.

Also, in the embodiment 1, although the antenna is realized as the transmitting/receiving common antenna 5, this antenna may be alternatively constituted as separate antenna structures, resulting in a similar effect. It should be noted that this antenna structure may be similarly applied to other embodiments.

Also, in the embodiment 1, the directions of the targets detected in the regions "D", "E", and "F" correspond to the respective beam directions. However, it should be understood that these beam directions are not always made in coincident with beam directions along which the target existence probability becomes high. As a consequence, it is conceivable that since the most beam scanning path is a straight path, the beam direction of the center beam is set to the target direction. Alternatively, the angle between the right beam and the left beam may be set in response to the distance, and may be set in response to a sensor output derived from a handle angle sensor 14, or a front-view monitoring camera, otherwise a yaw rate sensor, or a learning operation. As a consequence, the target direction may be set to such a direction along which the highest target existence probability defined in the radar system is realized.

(EMBODIMENT 2)

Figure 4:
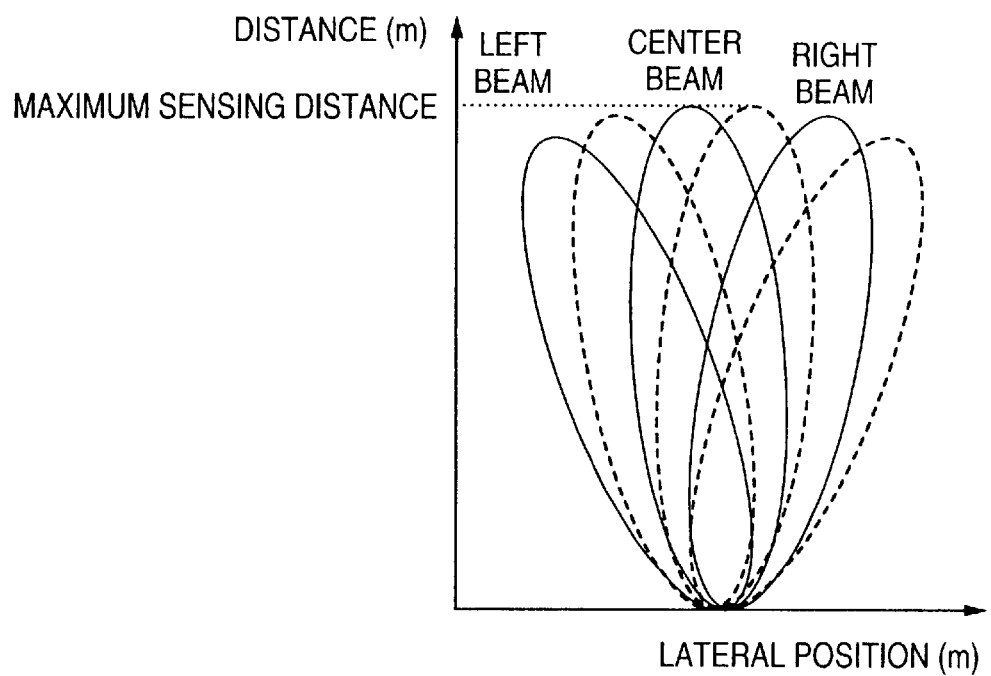
FIG. 4 is an explanatory diagram for explaining an embodiment 2 of the present invention.
Figure 5:
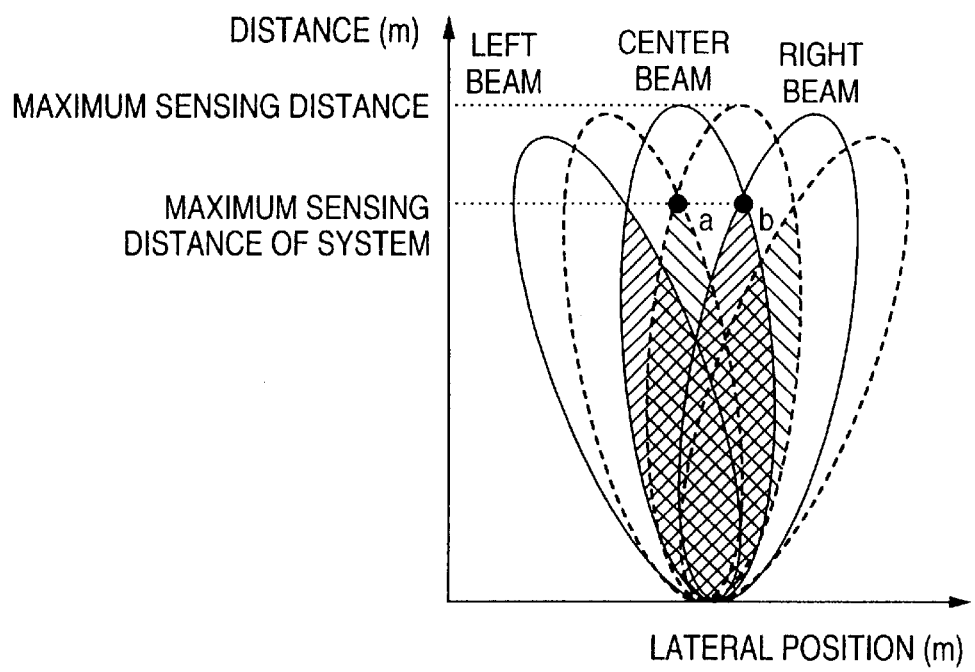
FIG. 5 is an explanatory diagram for explaining an angle-measurable area in the embodiment 2.

Referring now to FIG. 4 and FIG. 5, an embodiment 2 of the present invention will be described.

FIG. 4 is an explanatory diagram for explaining this embodiment 2 of the present invention. To solve the problem occurred in the embodiment 1, a direction of each of left, center, and right beams is changed every time 1 scanning operation is carried out. In FIG. 4, a portion indicated by a solid line corresponds to a first scanning operation, and a portion indicated by a broken line corresponds to a second scanning operation.

FIG. 5 is an explanatory diagram for explaining an angle-measurable area. In this angle-measurable area, portions corresponding to the angle-measurable areas "A", "B", and "C" shown in FIG. 2 are represented by hatched portions. Since the direction during the first scanning operation and the beam direction during the second scanning operation are changed every 1 scanning operation, the resultant angle-measurable area obtained by scanning the angle-measurable areas to each other during two scanning operations is increased, as compared with that of the general angle measuring method shown in FIG. 2. As a result, for example, even such a target object existed in the region D where the angle-measuring operation cannot be carried out during the first scanning operation may be angle-measured during the second scanning operation, depending upon the target existence position. As a result, practically speaking, the angle-measurable area can be increased.

As previously explained, in accordance with the embodiment 2, the area of the angle-measurable area can be increased. It is apparent from FIG. 5 that the maximum sensing distance of this system is substantially equal to that of the general method shown in FIG. 2. In the case that the left beam during the second scanning operation may be outputted along both the left beam direction and along the center beam direction during the first scanning operation, namely when a center of an angle between the preceding beams during the next scanning period is scanned (will be referred to "scanning step is made half of beam interval"), the angle-measurable area indicated by the hatched portion of FIG. 5 can be most effectively increased.

In particular, the beam scanning method becomes effective in such a case that the electronic switching method is combined with the mechanical scanning method.

Also, in the embodiment 2, the angle-measurable area is increased by two sets of the scanning operations. Alternatively, when a total number of scanning operations is increased, the angle-measurable area may be effectively increased.

(EMBODIMENT 3)

Subsequently, an embodiment 3 of the present invention will be described with reference to FIG. 6.

Figure 6:
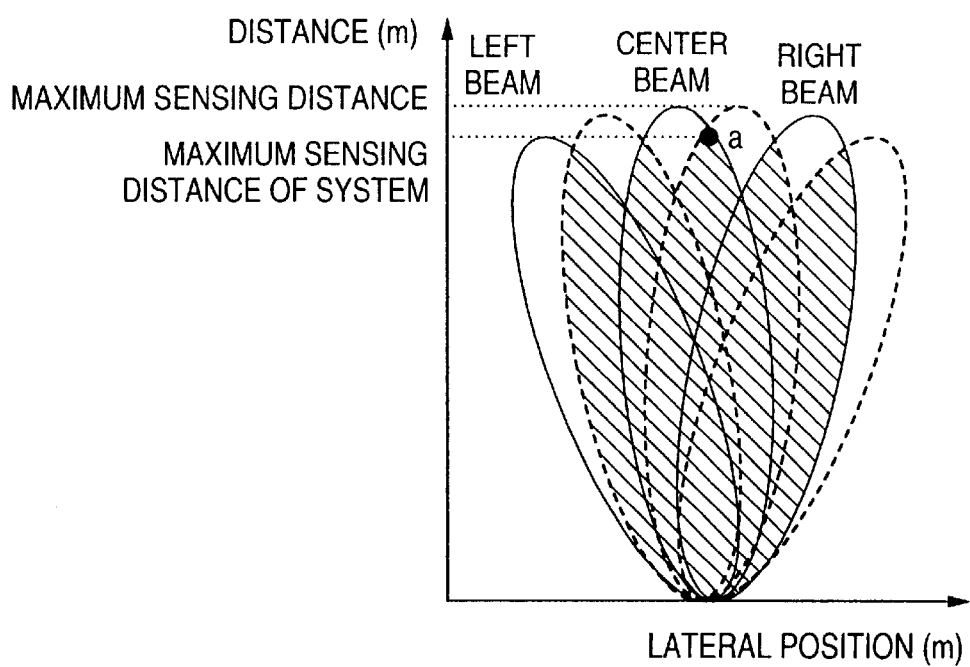
FIG. 6 is an explanatory diagram for explaining an embodiment 3 of the present invention.

FIG. 6 is an explanatory diagram for explaining this embodiment 3 of the present invention. Similar to the embodiment 2, in FIG. 6, a portion indicated by a solid line corresponds to a first scanning operation, a portion indicated by a broken line corresponds to a second scanning operation, and a scanning step is made equal to a half of a beam interval.

A description is made of an angle-measuring process operation in the case that the system is arranged as described above. A left beam, a center beam, and a right beam during a first scanning operation are assumed as a left-1 beam, a center-1 beam, and a right-1 beam, respectively. Similarly, a left beam, a center beam, and a right beam during a second scanning operation are assumed as a left-2 beam, a center-2 beam, and a right-2 beam, respectively. Then, while the signal processing apparatus 12 stores thereinto reception strengths detected by the respective beams during the first scanning operation and the second scanning operation, this signal processing apparatus 12 executes the angle-measuring calculation about these data based upon a combination between the left-1 beam and the left-2 beam, a combination between the left-2 beam and the center-1 beam, a combination between the center-1 beam and the center-2 beam, a combination between the center-2 beam and the right-1 beam, and also a combination between the right-1 beam and the right-2 beam. Since the signal processing apparatus 12 executes the angle-measuring process operation in this manner, it seems as if the scanning operations were simultaneously carried out along the six directions.

The angle-measurable area obtained when such a process operation is carried out is indicated in a hatched portion. Since the angle-measuring operation is carried out in this manner, the area of the angle-measurable area can be increased, as indicated by the hatched portion of FIG. 6, and at the same time, the maximum sensing distance of the radar system may be approximated to the maximum sensing distance represented by the radar performance.

In particular, the beam scanning method becomes effective in such a case that the electronic switching method is combined with the mechanical scanning method.

Also, in the embodiment 3, the angle-measurable area is increased by two sets of the scanning operations. Alternatively, when a total number of scanning operations is increased, the angle-measurable area may be effectively increased.

(EMBODIMENT 4)

Subsequently, an embodiment 4 of the present invention will be described with reference to FIG. 7.

Figure 7:
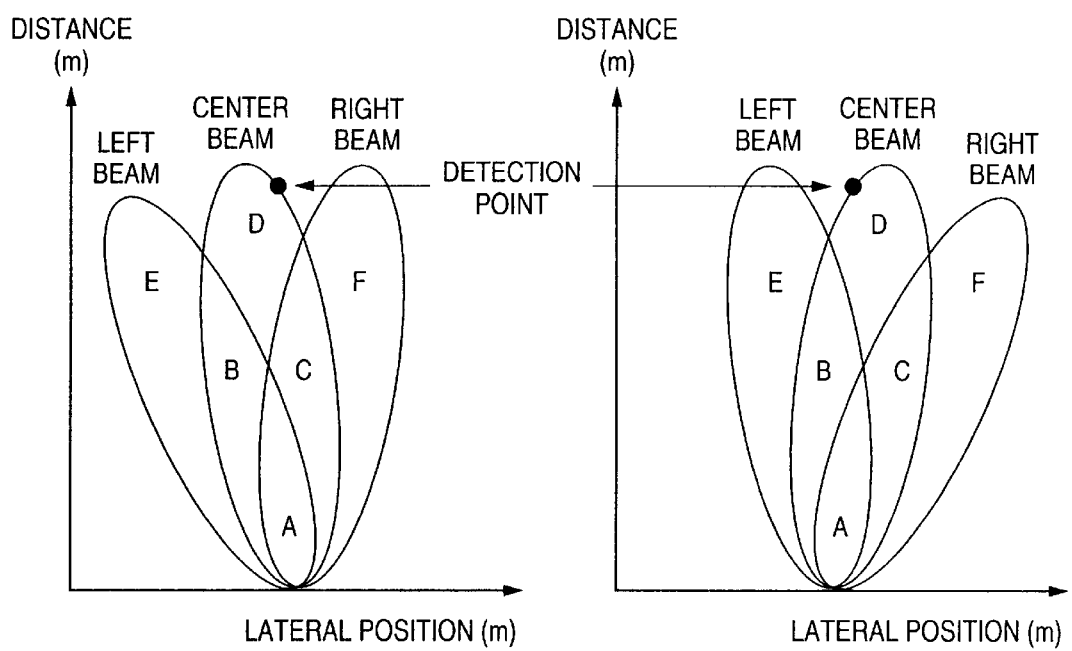
FIG. 7 is an explanatory diagram for explaining an embodiment 4 of the present invention.

FIG. 7 is an explanatory diagram for explaining this embodiment 4 of the present invention. A left-sided drawing of FIG. 7 is a diagram for showing such an operation that 3 beams are radiated and first directions of the respective beams are indicated. A right-sided drawing of FIG. 7 is a diagram for representing such an operation that these three beams are sequentially scanned over an entire region along a right direction at a relatively small step. Namely, this right-sided drawing indicates such a condition that the scanning operations of the respective beams along the right direction are accomplished. The scanning operations of these three beams are carried out as follows: At a first stage, as indicated in the left-sided drawing, the beams are projected in this order of the left beam, the center beam, and the right beam. Next, while the directions of the respective beams are slightly shifted along the right direction, the beams are projected in this order of the left beam, the center beam, and the right beam. Then, this scanning operation is repeatedly performed, and the final beam projection condition is shown in the right-sided drawing.

With employment of the above-explained arrangement, the regions "A", "B", and "C" are measured in accordance with the angle measuring method based upon the above-explained reception strengths of the same target detected along a plurality of directions. Furthermore, while the target positioned in the regions "D", "E", and "F" is scanned by the three beams from the left direction to the right direction, it is possible to acquire a maximum reception strength. The direction of this target can be recognized from the scanning direction at the position where this maximum reception strength is obtained. As a result, the angle-measuring operation can be carried out in all of the regions "A" to "F". In particular, the beam scanning method becomes effective in such a case that the electronic switching method is combined with the mechanical scanning method.

(EMBODIMENT 5)

Subsequently, an embodiment 5 of the present invention will be described with reference to FIG. 8.

Figure 8:
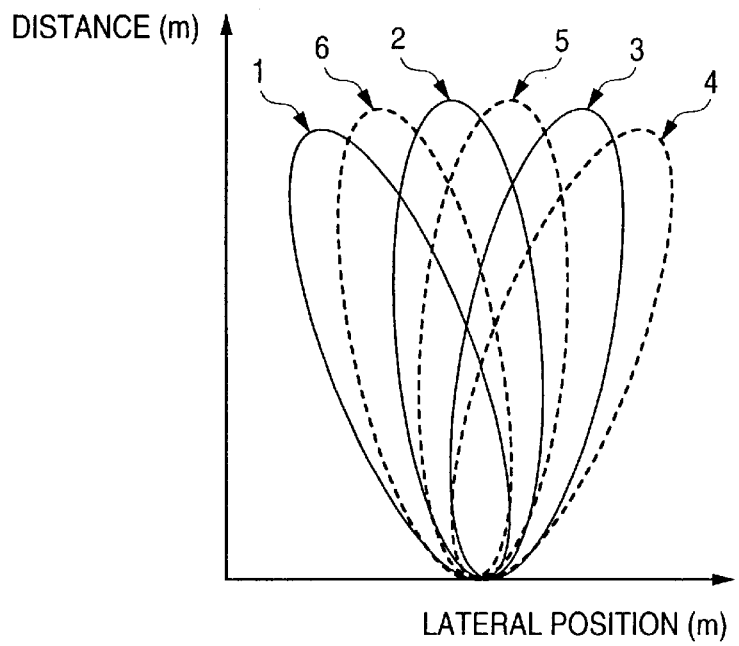
FIG. 8 is an explanatory diagram for explaining an embodiment 5 of the present invention.

FIG. 8 is an explanatory diagram for explaining this embodiment 5 of the present invention. Reference numerals "1" to "6" in FIG. 8 show a scanning sequence.

In the case that a motor control and a cam mechanism are utilized, when a beam is scanned in this scanning order of left, center, right, left, center and right, the time duration required to return the beam from the right direction to the left direction becomes relatively long, which may give an adverse influence to a distance measuring time period and an angle measuring time period. Also, since inertia force is rapidly changed, sounds and vibrations occur. As a result, the distance measuring precision and also the angle measuring precision are lowered. As shown in FIG. 8, when the beam is scanned in this scanning order of left, center, right, right, center, and left during a first scanning operation denoted by a solid line, and also during a second scanning operation indicated by a broken line, both the distance measuring time period and the angle measuring time period may be shortened, and furthermore, unnecessary vibrations maybe reduced. As a consequence, the distance measuring precision and the angle measuring precision can be improved.

(EMBODIMENT 6)

Subsequently, an embodiment 6 of the present invention will be described with reference to FIG. 9.

Figure 9:
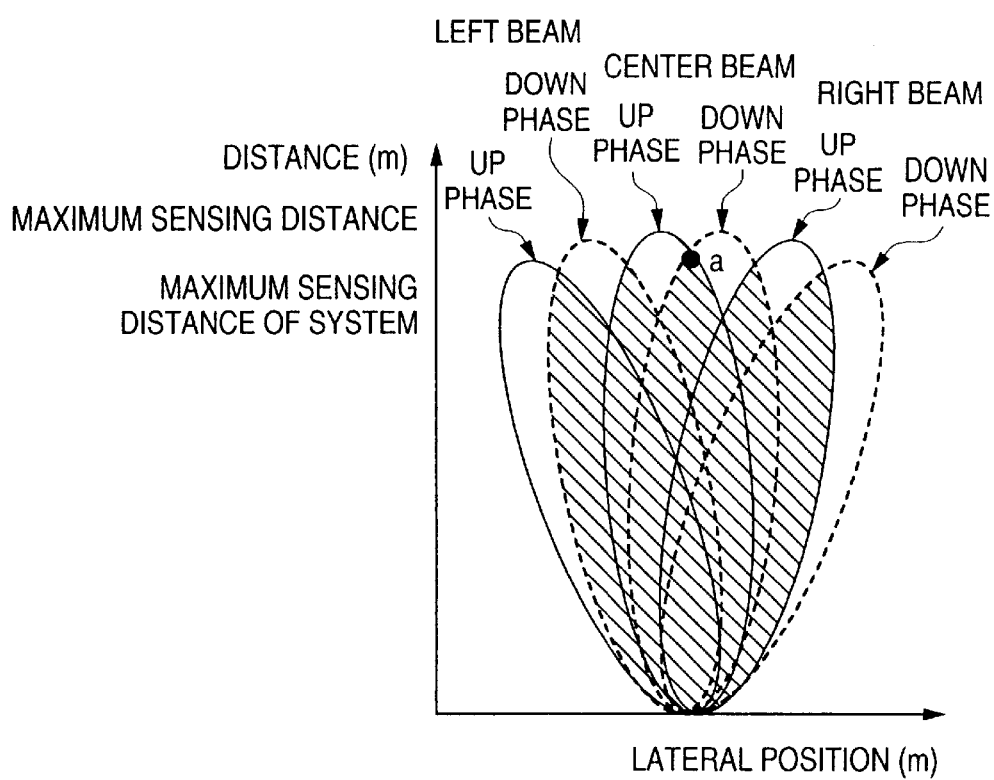
FIG. 9 is an explanatory diagram for explaining an embodiment 6 of the present invention.

FIG. 9 is an explanatory diagram for explaining this embodiment 6 of the present invention. The embodiment 6 may be effectively realized when this inventive idea is applied to, in particular, a radar with an FM modulation such as an FMCW radar and an FM pulse Doppler radar.

In FIG. 9, a portion indicated by a solid line corresponds to a beam in the case of an up phase (increase of frequency), and a portion indicated by a broken line corresponds to a beam in the case of a down phase (decrease of frequency). Both a distance measuring operation and a distance measuring operation are carried out by way of a left beam, a center beam, and a right beam, respectively. With respect to each of these beams, a beam direction is changed in the up phase and the down phase, and thus, the respective beams are assumed as a "left up beam", a "left down beam", a "center up beam", a "center down beam", a "right up beam", and a "right down beam". While the signal processing apparatus 12 stores thereinto reception strengths detected by these beams, this signal processing apparatus 12 executes the angle measuring calculation about these data based upon a combination between the left up beam and the left down beam, a combination between the left down beam and the center up beam, a combination between the center up beam and the center down beam, a combination between the center down beam and the right up beam, and also a combination between the right up beam and the right down beam. Since the signal processing apparatus 12 executes the angle-measuring process operation in this manner, it seems as if the scanning operations were simultaneously carried out along the six directions.

As indicated in a hatched portion in FIG. 9, since the angle-measuring operation is carried out in this manner, the area of the angle-measurable area can be increased, at the same time, the maximum sensing distance of the system may be considerably approximated to the maximum sensing distance represented by the radar performance. Also, since the angle-measuring operation is accomplished within 1 scanning operation, there is no time delay.

It should also be noted that the angle-measurable area is increased along the three directions in the embodiment 6. Alternatively, if the scan widths are equal to each other, then a total number of beams is increased, so that the angle-measurable area may be effectively increased.

Alternatively, when the scanning step is made equal to a half of a beam interval, the angle-measurable area shown in the hatched portion of FIG. 9 may be increased in the highest efficiency.

As previously described in detail, the radar apparatus, according to the present invention, is featured by comprising: transmitting means for outputting a transmission electromagnetic wave; receiving means for detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; amplitude peak value detecting means for detecting a peak value of the amplitude level from the frequency spectrum by the data converted by the signal converting means; beam scanning means for changing both a beam direction of the transmission electromagnetic wave and a beam direction of the reception electromagnetic wave; and measured-angle processing means for calculating angles of the same target object, which are detected along a plurality of beam directions changed by the beam scanning means, by employing the peak values of the amplitude levels detected by the amplitude peak value detecting means along the respective directions; and for judging that an angle of the target object detected only along a single beam direction as a preset angle.

As a consequence, the angle-measurable area can be increased without adding a specific apparatus. Moreover, the maximum sensing distance of the radar system can be increased.

Also, a radar apparatus, according to the present invention, is featured by comprising: transmitting means for outputting a transmission electromagnetic wave; receiving means for detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; amplitude peak value detecting means for detecting a peak value of the amplitude level from the frequency spectrum by the data converted by the signal converting means; beam scanning means for scanning plural directions while stopping a beam of the transmission electromagnetic wave and a beam of the reception electromagnetic wave at a predetermined angle, and for changing the beam stopping angle in a preselected sequence; and measured-angle processing means for calculating angles of the same target object, which are detected along a plurality of beam directions changed by the beam scanning means, by employing the peak values of the amplitude level detected by the amplitude peak value detecting means along the respective directions. As a result, the maximum sensing distance of the radar system can be increased, and additionally, the angle-measurable area can be further increased without adding a specific apparatus.

Furthermore, since the beam scanning means changes the beam stopping angle every scanning period, and the measured-angle processing means employs peak values of amplitude levels acquired along a plurality of beam directions within first and second scanning periods, the maximum sensing distance of the radar system can be furthermore increased.

Also, since the beam scanning means scans in such a manner that the beam is reciprocated during one scanning period, the unnecessary vibration is reduced, so that the angle measuring precision can be improved.

Furthermore, the transmitting means outputs a transmission electromagnetic wave which is frequency-swept, the beam scanning means changes the beam stopping angle every time the frequency sweeping operation is performed, and the measured-angle processing means employs peak values of amplitude levels acquired along adjoining beam directions. As a consequence, the maximum sensing distance of the radar system can be considerably approximated to the original performance of the radar system without adding a specific apparatus. Also, since the time delay of the angle measuring operation can be reduced, the angle-measuring precision can be improved.

Moreover, since the beam scanning means scans in such a manner that a change amount of the beam stopping angle becomes a half of an angle defined between the adjoining angles, the angle-measurable area can be simply increased in a high efficiency without adding a specific apparatus.

Also, a radar apparatus, according to the present invention, is featured by comprising: transmitting means for outputting a transmission electromagnetic wave; receiving means for detecting a reception electromagnetic wave received when the transmission electromagnetic wave is reflected from a target object and returned from the target object; signal converting means for converting an output signal of the receiving means into data indicated by a relationship between a frequency and an amplitude level of the output signal, from which a frequency spectrum is revealed; amplitude peak value detecting means for detecting a peak value of the amplitude level from the frequency spectrum by the data converted by the signal converting means; beams scanning means for scanning plural directions while stopping a beam of the transmission electromagnetic wave and a beam of the reception electromagnetic wave at a predetermined angle, and for moving the beams over an entire scanning region while sequentially and slightly changing the beam stopping angle; and measured-angle processing means for calculating angles of the same target object, which are detected along a plurality of beam directions changed by the beam scanning means, by employing the peak values of the amplitude levels detected by the amplitude peak value detecting means along the respective directions; and for calculating an angle of the target object detected only along a single beam direction from a change in the peak values of the amplitude levels. As a result, the maximum sensing distance of the radar system can be increased, and additionally, the angle-measurable area can be further increased without adding a specific apparatus.

What is claimed is:

1. A radar apparatus comprising:

a transmitter for outputting a transmission electromagnetic wave;

a receiver for detecting a reception electromagnetic wave received when said transmission electromagnetic wave is reflected from a target object and returned from the target object;

a signal converter for converting an output signal of said receiver into data indicated by a relationship between a frequency and an amplitude level of the output signal, from which a frequency spectrum is revealed;

an amplitude peak value detector for detecting a peak value of the amplitude level from the frequency spectrum by the data converted by said signal converter;

a beam scanner for changing both a beam direction of the transmission electromagnetic wave and a beam direction of the reception electromagnetic wave; and a measured-angle processor for calculating angles of the same target object, which are detected along a plurality of beam directions changed by said beam scanner, by employing the peak values of the amplitude levels detected by said amplitude peak value detector along the respective directions, and for judging an angle of the target object detected only along a single beam direction as a preset angle.

2. The radar apparatus as claimed in claim 1 wherein:
an angle of the target object is set to be equal to an angle of a detected beam.

3. A radar apparatus comprising:

a transmitter for outputting a transmission electromagnetic wave;

a receiver for detecting a reception electromagnetic wave received when said transmission electromagnetic wave is reflected from a target object and returned from the target object;

a signal converter for converting an output signal of said receiver into data indicated by a relationship between a frequency and an amplitude level of the output signal, from which a frequency spectrum is revealed;

an amplitude peak value detector for detecting a peak value of the amplitude level from the frequency spectrum by the data converted by said signal converter;

a beam scanner for scanning plural directions while stopping a beam of the transmission electromagnetic wave and a beam of the reception electromagnetic wave at a predetermined angle, and for changing the beam stopping angle in a preselected sequence; and a measured-angle processor for calculating angles of the same target object, which are detected along a plurality of beam directions changed by said beam scanner, by employing the peak values of the amplitude level detected by said amplitude peak value detector along the respective directions.

4. The radar apparatus as claimed in claim 3, wherein
said beam scanner changes the beam stopping angle every scanning period, and said measured-angle processor employs peak values of amplitude levels acquired along a plurality of beam directions within the same scanning period.

5. The radar apparatus as claimed in claim 3, wherein
said beam scanner changes the beam stopping angle every scanning period, and said measured-angle processor employs peak values of amplitude levels acquired along a plurality of beam directions within a first and a second scanning periods.

6. The radar apparatus as claimed in claim 3, wherein
said beam scanner scans in such a manner that said beam is reciprocated during one scanning period.

7. The radar apparatus as claimed in claim 3, wherein said transmitter outputs a electromagnetic wave which is frequency-swept, said beam scanner changes the beam stopping angle every time the frequency sweeping operation is performed, and said measured-angle processor employs peak values of amplitude levels acquired along adjoining beam directions.

8. The radar apparatus as claimed in claim 3, wherein
said beam scanner scans in such a manner that a change amount of the beam stopping angle becomes a half of an angle defined between the adjoining angles.

9. A radar apparatus comprising:

a transmitter for outputting a transmission electromagnetic wave;

a receiver for detecting a reception electromagnetic wave received when said transmission electromagnetic wave is reflected from a target object and returned from the target object;

a signal converter for converting an output signal of said receiver into data indicated by a relationship between a frequency and an amplitude level of the output signal, from which a frequency spectrum is revealed;

an amplitude peak value detector for detecting a peak value of the amplitude level from the frequency spectrum by the data converted by said signal conveter;

a beam scanner for scanning plural directions while stopping a beam of the transmission electromagnetic wave and a beam of said reception electromagnetic wave at a predetermined angle, and for moving the beams over an entire scanning region while sequentially and slightly changing the beam stopping angle; and a measured-angle processor for calculating angles of the same target object, which are detected along a plurality of beam directions changed by said beam scanner, by employing the peak values of the amplitude levels detected by said amplitude peak value detector along the respective directions, and for calculating an angle of the target object detected only along a single beam direction from a change in the peak values of the amplitude levels.

10. A radar apparatus comprising:

a transmitter for outputting a transmission electromagnetic wave;

a receiver for detecting a reception electromagnetic wave received when said transmission electromagnetic wave is reflected from a target object and returned from the target object;

a signal converter for converting an output signal of said receiver into data indicated by a relationship between a frequency and an amplitude level of the output signal, from which a frequency spectrum is revealed, wherein said signal converter executes the fast Fourier transform;

an amplitude peak value detector for detecting a peak value of the amplitude level from the frequency spectrum by the data converted by said signal converter;

a beam scanner; and a measured-angle processor.

* * * * *